(12) United States Patent
Jan et al.

(10) Patent No.: US 8,120,348 B2
(45) Date of Patent: Feb. 21, 2012

(54) POWER CONVERTER WITH IMPROVED LINE TRANSIENT RESPONSE, CONTROL CIRCUIT FOR POWER CONVERTER, AND METHOD FOR IMPROVING LINE TRANSIENT RESPONSE

(75) Inventors: Chueh-Kuei Jan, Chubei (TW); Shui-Mu Lin, Taichung (TW)

(73) Assignee: Richtek Technology Corporation (TW)

( * ) Notice: Subject to any disclaimer, the term of this patent is extended or adjusted under 35 U.S.C. 154(b) by 384 days.

(21) Appl. No.: 12/459,506

(22) Filed: Jul. 2, 2009

(65) Prior Publication Data
US 2010/0231183 A1 Sep. 16, 2010

(30) Foreign Application Priority Data
Mar. 12, 2009 (TW) .............................. 98108051 A

(51) Int. Cl.
*G05F 5/00* (2006.01)
(52) U.S. Cl. .......................................... 323/299; 363/41
(58) Field of Classification Search .................. 323/299, 323/301; 363/41
See application file for complete search history.

(56) References Cited

U.S. PATENT DOCUMENTS

| | | | | |
|---|---|---|---|---|
| 6,593,725 B1 * | 7/2003 | Gallagher et al. | ............ | 323/284 |
| 7,019,503 B1 * | 3/2006 | Ortiz et al. | .................... | 323/282 |
| 7,164,258 B2 * | 1/2007 | Umminger | .................... | 323/282 |

* cited by examiner

*Primary Examiner* — Harry Behm
(74) *Attorney, Agent, or Firm* — Tung & Associates

(57) ABSTRACT

The present invention discloses a power converter with improved line transient, comprising: a power stage circuit including at least one power transistor switch which operates to convert an input voltage to an output voltage; an error amplifier comparing a feedback signal with a reference signal to generate an error signal; an input voltage instant variation extraction circuit extracting an instant variation of the input voltage and generating a signal relating to the instant variation; and a PWM comparator generating a PWM signal according to at least a ramp signal, the error signal, and the signal relating to the instant variation, to thereby control the operation of the power transistor switch in the power stage circuit.

16 Claims, 7 Drawing Sheets

US 8,120,348 B2

POWER CONVERTER WITH IMPROVED LINE TRANSIENT RESPONSE, CONTROL CIRCUIT FOR POWER CONVERTER, AND METHOD FOR IMPROVING LINE TRANSIENT RESPONSE

FIELD OF INVENTION

The present invention relates to a power converter with improved line transient response, a control circuit for power converter, and a method for improving line transient.

DESCRIPTION OF RELATED ART

There are various types of power converters such as buck converter, boost converter, inverter converter, buck-boost converter, and fly back converter. FIG. 1 shows a conventional buck converter, which comprises two power transistor switches Q1 and Q2 controlled by a control circuit 10. The control circuit 10 generates switch control signals according to a feedback voltage signal FB extracted from an output terminal; the switch control signals control the operation of the transistors Q1 and Q2 so as to transmit power from the input IN to the output OUT. FIG. 2 shows a boost converter 2; FIG. 3 shows an inverter converter 3; FIG. 4 shows a buck-boost converter 4; FIG. 5 shows a fly back converter 5. Despite the foregoing circuits have different circuit structures and different numbers of power transistor switch(es), all the circuits operate under the same mechanism that the control circuit 10 generates switch control signal(s) to control the power transistor switch(es) according to the feedback voltage signal FB. (The fly back converter 5 receives the feedback voltage signal FB via a photo-coupler circuit 19, which is well known to a person skilled in the art, and thus its details are omitted here.)

In the foregoing prior art, the control circuit 10 typically includes an internal structure as shown in FIG. 6, wherein an error amplifier (EA) 12 compares the feedback voltage signal FB with a reference voltage Vref to generate an error signal $V_{EA}$. And then, a pulse width modulation (PWM) comparator 14 compares the error signal $V_{EA}$ with a ramp signal to generate a PWM signal. Next, based on the PWM signal, a driver circuit 16 generates a signal having a voltage level sufficient to drive a gate of the power transistor switch Q.

The above mentioned prior art has the following drawback: when a line transient occurs in the input voltage, for example because of an unstable power supply or other reasons, the response of the entire circuitry is not quick enough. The line transient is first reflected in the output voltage, and the resultant voltage variation is fed back via the error amplifier EA12 and the PWM comparator 14, etc., which causes more delay, to the power transistor switch Q. Furthermore, the power transistor switch Q requires multiple switching cycles to finally balance the output voltage to the desired level.

US publication No. 2007/0013354 proposes a method to predict an end point as shown in FIG. 7, which is for use in a buck converter. When the reference voltage Vref varies, the reference voltage Vref is fed forward and directly added to the output of the error amplifier EA 12, so as to speed up the response time for the circuit to reach a stable state. This prior art is not for solving the problem of line transient; its focus is on solving the response efficiency problem under the circuit structure wherein the reference voltage Vref is variable. This prior art method is not applicable to the circuit structure wherein the reference voltage Vref is a constant. Furthermore, the solution proposed by this prior art to feed forward the reference voltage Vref can only be applied to buck converter, but can not be applied to boost converter, inverter converter, and other power converters.

In view of the foregoing demerits of the prior art, the present invention proposes a power converter with improved line transient response, a control circuit for power converter, and a method for improving line transient response.

SUMMARY OF THE INVENTION

An objective of the present invention is to provide a power converter with improved line transient response.

Another objective of the present invention is to provide a control circuit for power converter.

A yet another objective of the present invention is to provide a method for improving line transient response.

In order to achieve the foregoing objective, in one perspective, the present invention provides a power converter with improved line transient response, comprising: a power stage circuit including at least one power transistor switch which operates to convert an input voltage to an output voltage; an error amplifier comparing a feedback signal with a reference signal to generate an error signal; an input voltage instant variation extraction circuit extracting an instant variation of the input voltage and generating a signal relating to the instant variation; and a pulse width modulation (PWM) comparator generating a PWM signal according to at least a ramp signal, the error signal, and the signal relating to the instant variation, to thereby control the operation of the power transistor switch in the power stage circuit.

The power converter preferably further comprises an output voltage feedback circuit generating a second feedback signal relating to the output voltage, and wherein the PWM comparator generates the PWM signal according to the ramp signal, the error signal, the signal relating to the instant variation, and the second feedback signal.

In another perspective, the present invention provides a control circuit for power converter, the power converter including at least a power transistor switch which operates to convert an input voltage to an output voltage, the control circuit including: an error amplifier comparing a first feedback signal relating to the input voltage with a reference signal to generate an error signal; an input voltage instant variation extraction circuit extracting an instant variation of the input voltage and generating a signal relating to the instant variation; and a PWM comparator generating a PWM signal according to at least a ramp signal, the error signal, and the signal relating to the instant variation, to thereby control the operation of the power transistor switch in the power converter.

In one embodiment, the input voltage instant variation extraction circuit in the power converter and the control circuit includes: a first divided voltage circuit including a first resistor and a second resistor connected in series, and a first capacitor connected in parallel with the first resistor, wherein the first resistor has one terminal coupled to the input voltage and another terminal coupled to one terminal of the second resistor, and the second resistor has another terminal coupled to ground; a second divided voltage circuit including a third resistor and a fourth resistor connected in series, and a second capacitor connected in parallel with the fourth resistor, wherein the third resistor has one terminal coupled to the input voltage and another terminal coupled to one terminal of the fourth resistor, and the fourth resistor has another terminal coupled to ground; and an operational amplifier having inputs coupled respectively to a node between the first resistor and the second resistor, and to a node between the third resistor and the fourth resistor.

In yet another perspective, the present invention provides a method for improving line transient response of a power converter, the power converter including a power stage circuit, the power stage circuit including at least a power transistor switch which operates to convert an input voltage to an output voltage, the method comprising: comparing a first feedback signal relating to the output voltage with a reference signal to generate an error signal; extracting an instant variation of the input voltage and generating a signal relating to the instant variation; receiving a ramp signal; generating a PWM signal according to at least the ramp signal, the error signal, and the signal relating to the instant variation; and controlling the power transistor switch in the power stage circuit according to the PWM signal.

In the foregoing method, the step of extracting the instant variation of the input voltage preferably includes: retaining a first divided voltage value of the input voltage at a first instance; acquiring a second divided voltage value of the input voltage at a second instance; and obtaining a difference between the first divided voltage value and the second divided voltage value. Furthermore, the difference between the first divided voltage value and the second divided voltage value can be multiplied by a ratio and outputted.

The present invention can be applied to a buck converter, boost converter, inverter converter, buck-boost converter, and fly back converter.

The objectives, technical details, features, and effects of the present invention will be better understood with regard to the detailed description of the embodiments below, with reference to the drawings.

DESCRIPTION OF THE PREFERRED EMBODIMENTS

Figure 8:
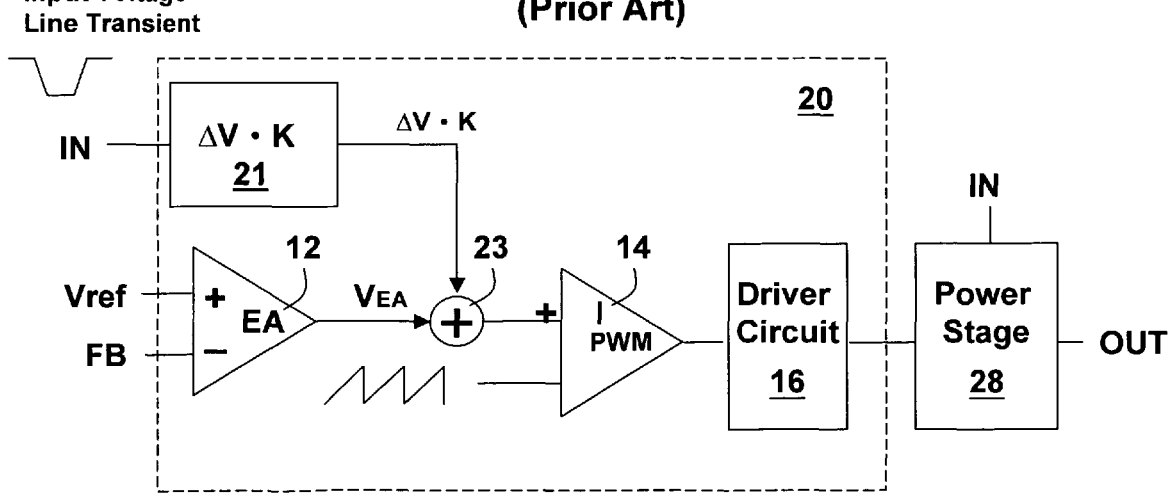
FIG. 8 shows the first embodiment of the present invention.
Figure 9A:
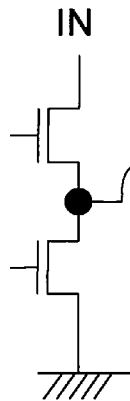
FIGS. 9A-9G show several embodiments of the power stage circuit 28.
Figure 9B:
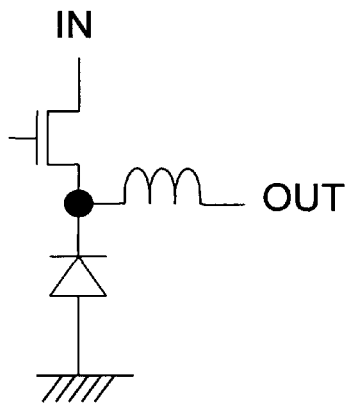
Figure 9C:
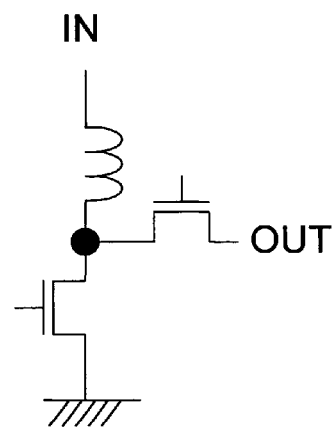
Figure 9D:
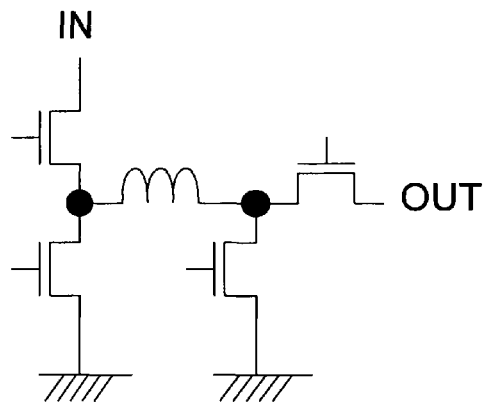
Figure 9E:
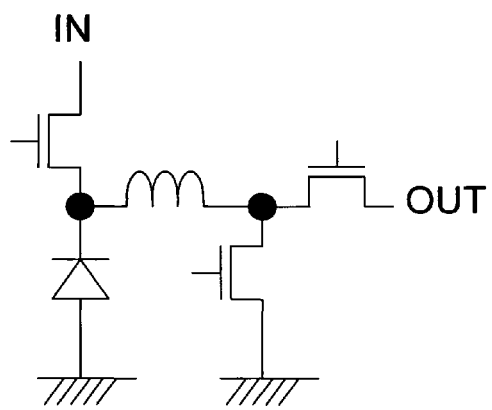
Figure 9F:
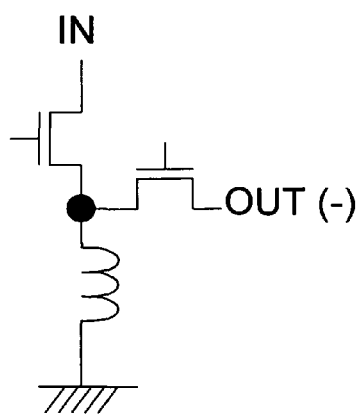
Figure 9G:
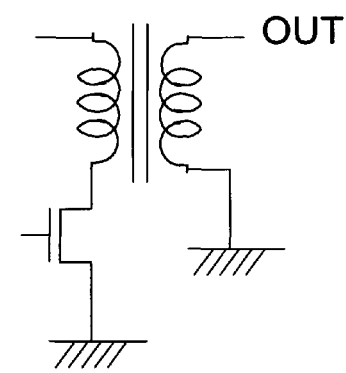

Please refer to FIG. 8, which shows the first embodiment of the preset invention. The present invention obtains an instant variation $\Delta V$ of an input voltage IN and converts it by a proper ratio (K, where K can be any positive or negative real number and its absolute value can be more than, equal to, or less than 1) by an input voltage instant variation extraction circuit ($\Delta V \cdot K$) 21. Subsequently, the result ($\Delta V \cdot K$) is directly added to an output of the error amplifier EA 22 to speed up the response to the input voltage line transient.

More specifically, as shown in FIG. 8, the power converter with improved line transient response of the present invention comprises an error amplifier (EA) 12, a PWM comparator 14, a driver circuit 16, an input voltage instant variation extraction circuit 21, and a power stage circuit 28, wherein the circuits other than the power stage circuit 28 form a control circuit 20. The power stage circuit 28 converts an input voltage IN to an output voltage OUT by the switching of its internal power transistor switch(es). The power stage circuit 28 for example can be (but not limited to) any form illustrated in FIGS. 9A-9G. When the input voltage IN is stable without transient, the input voltage instant variation extraction circuit 21 has a zero output, and the output $V_{EA}$ of the error amplifier 12 is directly transmitted to a positive input of the PWM comparator 14 to be compared with a ramp signal. A PWM signal is thus generated, which drives the power transistor switch in the power stage circuit 28 through the driver circuit 16. On the other hand, when a line transient occurs in the input voltage IN, the input voltage instant variation extraction circuit 21 obtains the instant variation $\Delta V$ of the input voltage IN and converts it by a ratio of K so that it has a proper relationship with the feedback signal FB, the reference signal Vref, and the output voltage OUT. After this converted voltage ($\Delta V \cdot K$) is added to the error amplified signal $V_{EA}$, the sum is compared with the ramp signal in the PWM comparator 14 to generate a PWM signal. FIG. 8 shows that the addition of the ($\Delta V \cdot K$) and the signal $V_{EA}$ is achieved by an adder 23. However, this adder does not have to include any physical electronic device; in a simplest form, it can be just a node.

Figure 10:
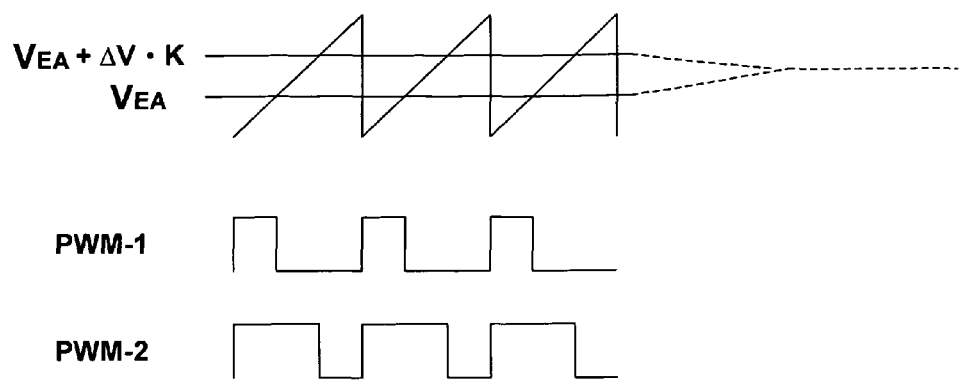
FIG. 10 shows how a PWM signal quickly responds to the input voltage line transient.

FIG. 10 shows, by way of example, a response that may take place when a line transient occurs in the input voltage. Assuming that the power stage circuit 28 performs boost conversion, and the original output signal of the PWM comparator 14 is PWM-1, when the input voltage IN suddenly drops, because the input voltage instant variation extraction circuit 21 quickly generates an output ($\Delta V \cdot K$) which is added on the error amplified signal $V_{EA}$, the PWM comparator 14 compares the signal $V_{EA}+(\Delta V \cdot K)$ with the ramp signal, and the output of the PWM comparator 14 quickly changes to PWM-2 so that the power stage circuit 28 operates in a higher duty ratio for boost conversion. When the input voltage IN becomes stable, the signal ($\Delta V \cdot K$) approaches zero, and the error amplified signal $V_{EA}$ will be balanced at a new level as shown by the dash lines in the drawing.

Figure 11:
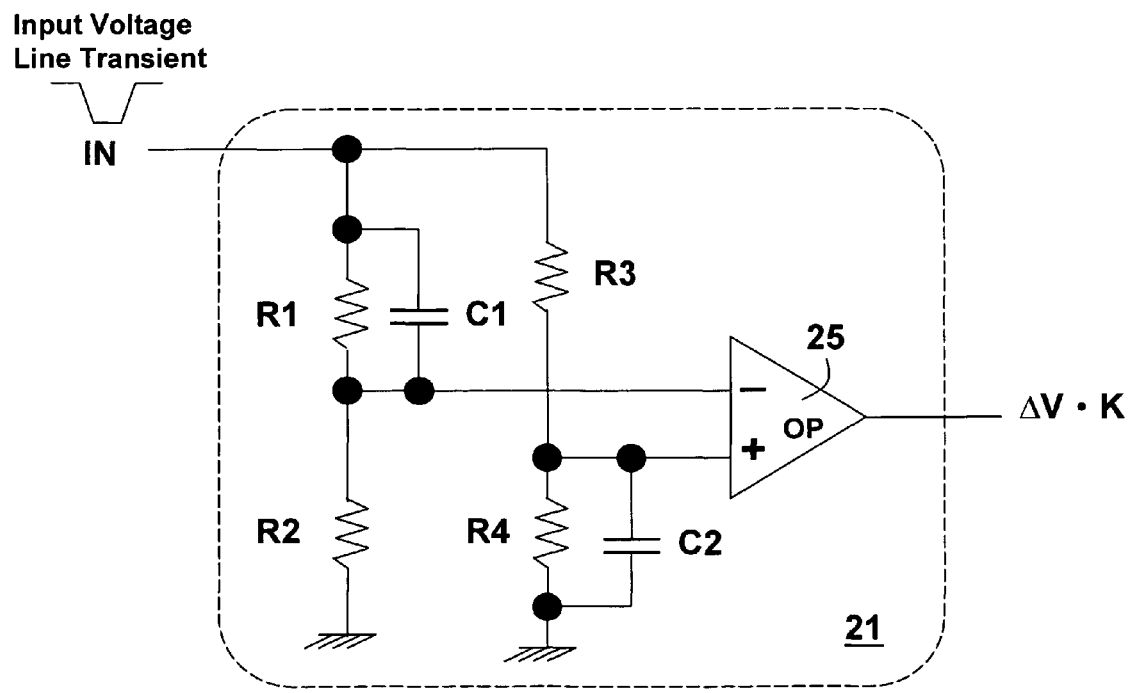
FIG. 11 shows an embodiment of the input voltage instant variation extraction circuit 21.

The input voltage instant variation extraction circuit 21 can be embodied in many forms; an example is shown in FIG. 11. A divided voltage circuit formed by resistors R1 and R2, and a divided voltage circuit formed by resistors R3 and R4 obtain respective divided voltages from the input voltage IN, wherein the resistors R1 and R4 are connected in parallel with the capacitors C1 and C2, respectively. When a line transient occurs in the input voltage, the voltage across the capacitor C2 retains the level of the previous instance, but due to the coupling effect by the capacitor C1, the voltage across the resistor R2 changes quickly to the level of the current instance. The voltage difference therebetween is proportional to the variation $\Delta V$ of the input voltage IN, and this voltage difference can be multiplied by a ratio by the operational amplifier OP 25 and outputted.

Figure 1:
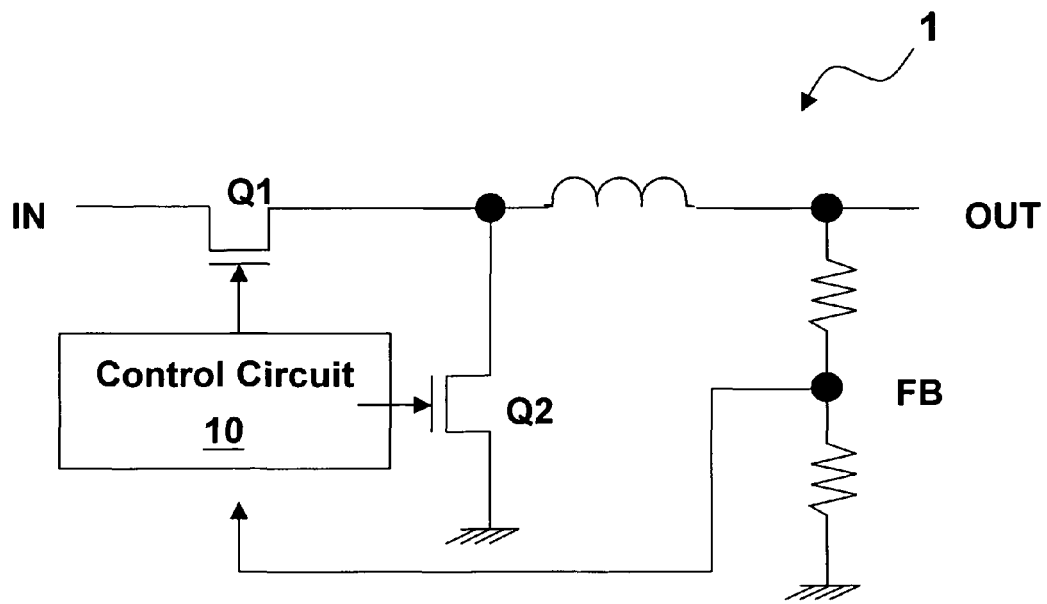
FIGS. 1-5 show prior art buck converter, boost converter, inverter converter, buck-boost converter, and fly back converter, respectively.
Figure 2:
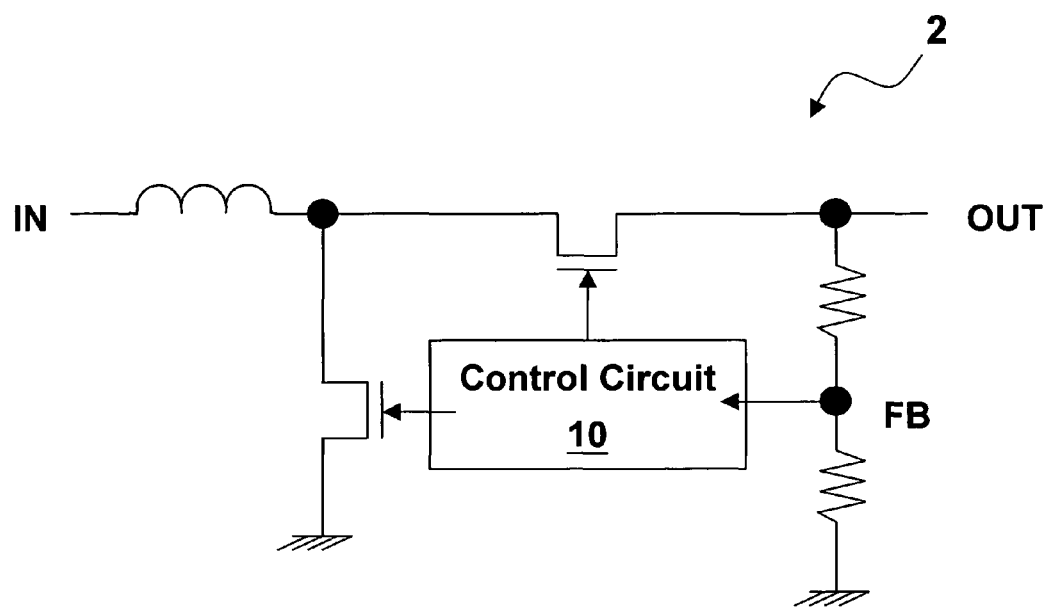
Figure 3:
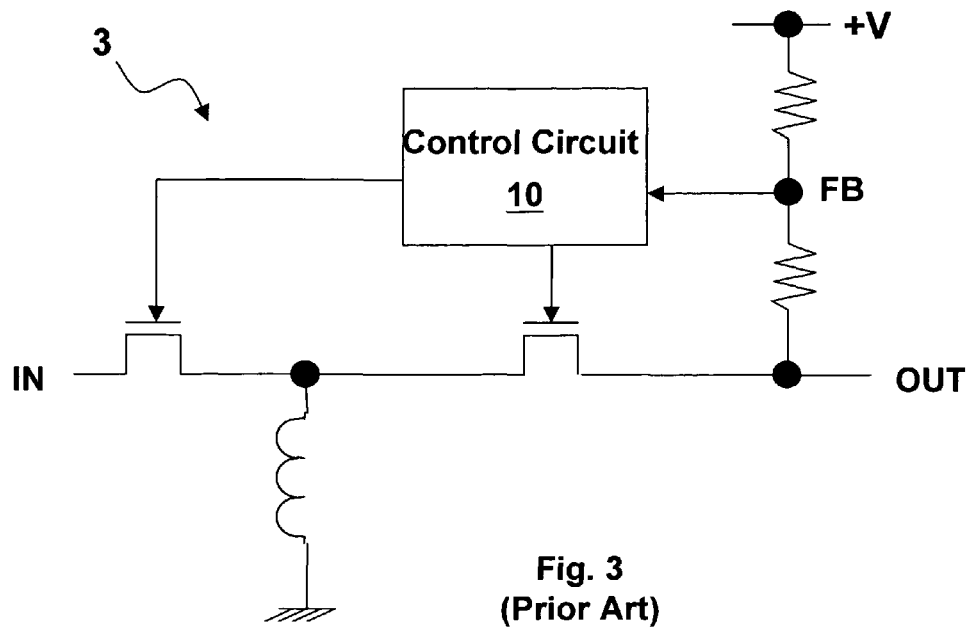
Figure 4:
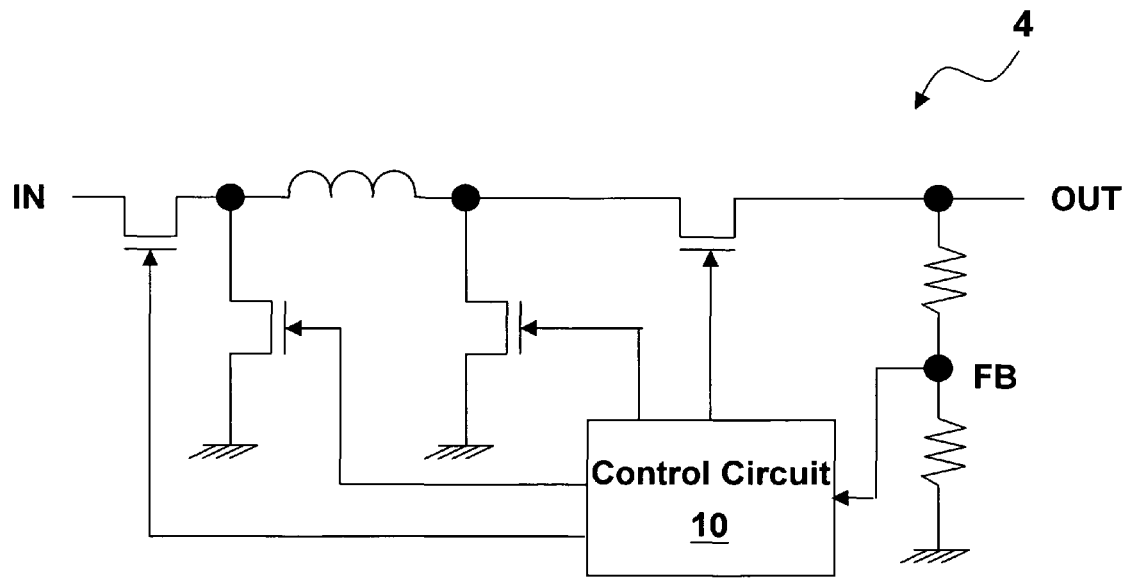
Figure 5:
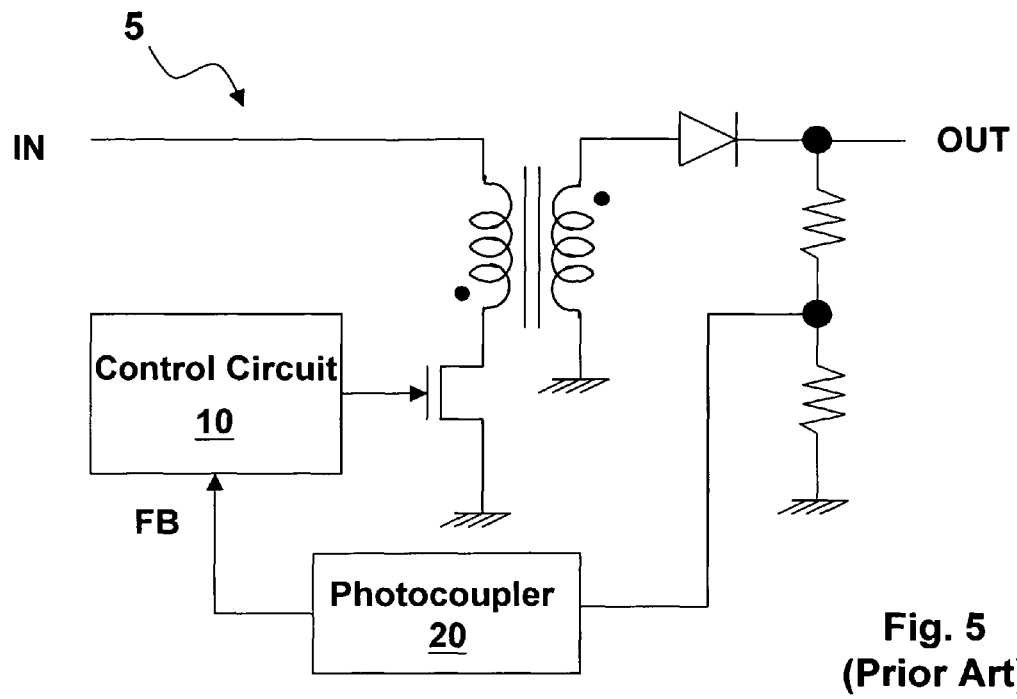
Figure 6:
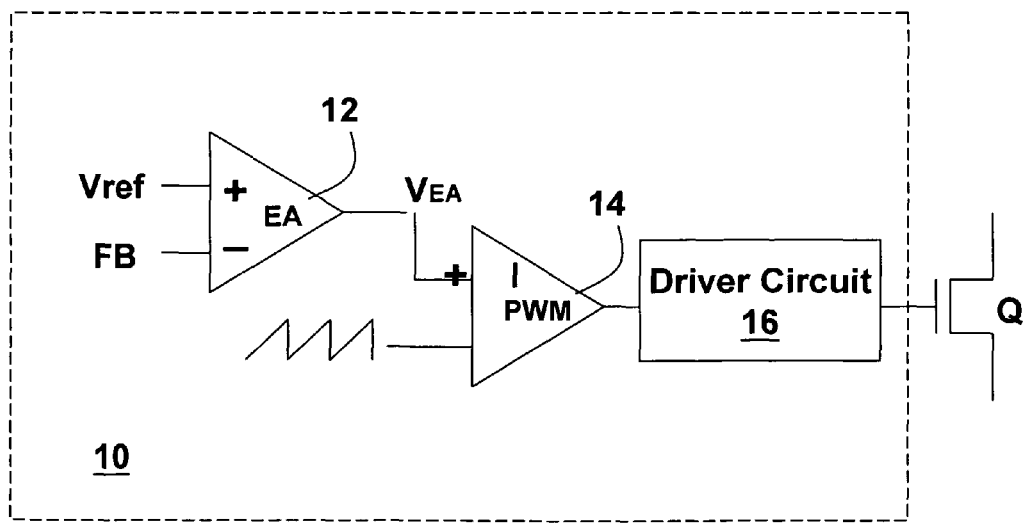
FIG. 6 shows an internal circuit diagram of the control circuit in the power converters of FIGS. 1-5.
Figure 7:
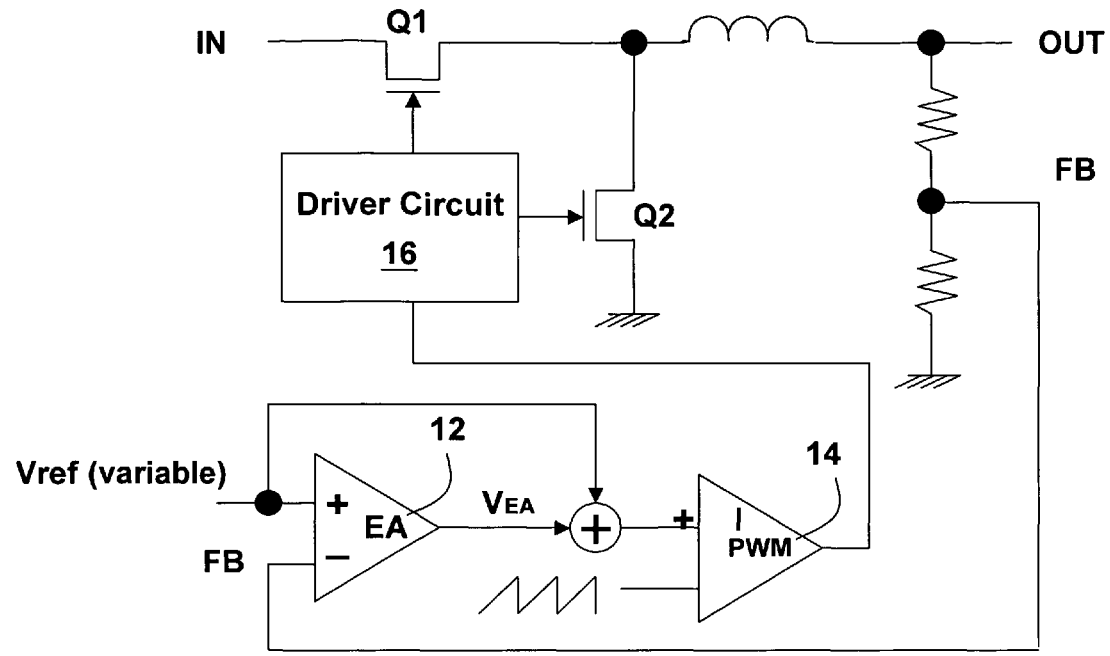
FIG. 7 shows, in a simplified form, the circuit structure disclosed in the US publication No. 2007/0013354.

According to an experiment of the inventors, when a line transient occurs in the input voltage IN which lasts for about 50 microseconds, the prior art as shown in FIG. 6 requires a response time of about 60 microseconds to reach a stable state, but the present invention takes only about 10 microseconds to reach the stable state, well advanced of the prior art.

Figure 12:
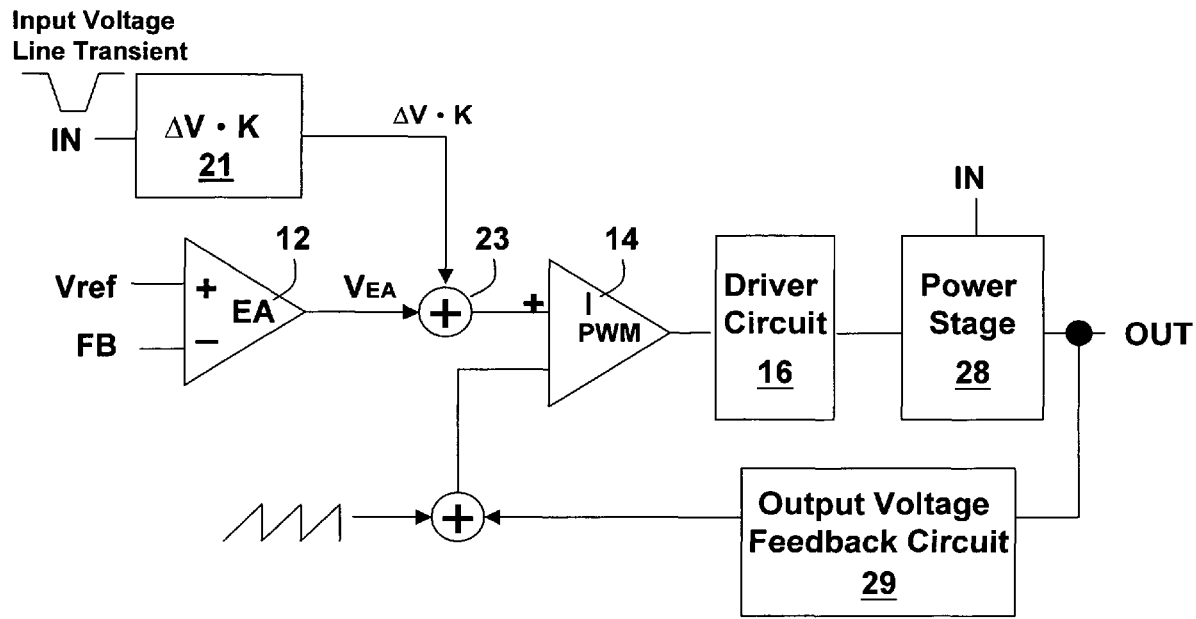
FIG. 12 and FIG. 13 show two embodiments of the present invention.
Figure 13:
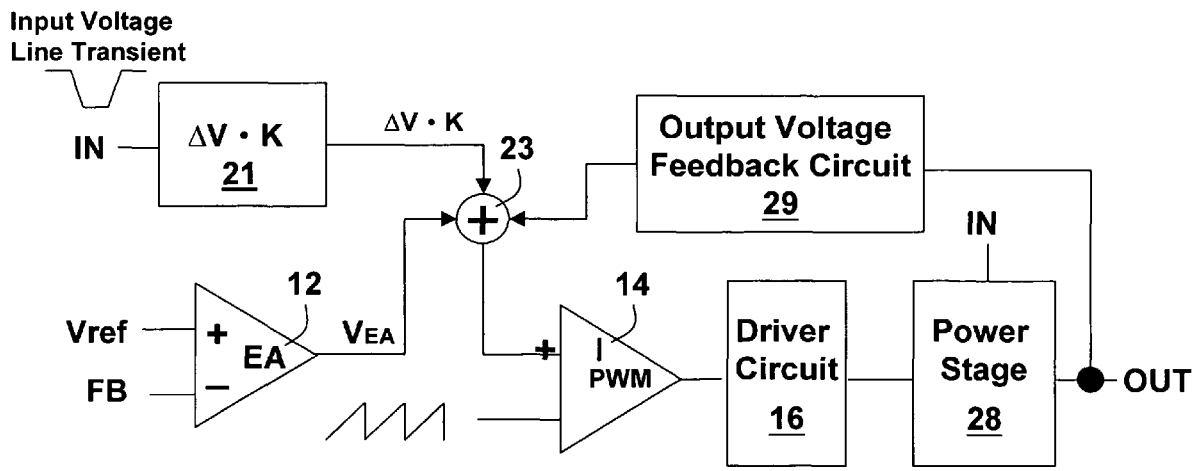

FIG. 12 shows another embodiment of the present invention. The difference between this embodiment and the embodiment in FIG. 8 is that the FIG. 8 employs open loop control while this embodiment employs close loop control. As shown in the drawing, an output voltage feedback circuit 29 generates and feedbacks a signal relating to the output voltage OUT, and the signal is added to the ramp signal and the sum is inputted to a negative input of the PWM comparator 14. The output voltage feedback circuit 29 for example can be achieved by a resistor divided voltage circuit. FIG. 13 shows another embodiment of the present invention. The difference between this embodiment and the embodiment of FIG. 12 is that the output of the output voltage feedback circuit 29 is added to the error amplified signal $V_{EA}$ instead. Both the foregoing embodiments of FIGS. 12 and 13 employ close loop control. As for other circuit details, they are similar to FIG. 8 and thus omitted. Certainly, the positive or negative sign of the output of the output voltage feedback circuit 29 in FIGS. 12 and 13 should be properly arranged before it is added to (or subtracted from) other signals.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positive input and negative input of each comparator, error amplifier, and operational amplifier can be interchanged, as long as the subsequent circuit is correspondingly modified. As another example, a circuit which does not affect the main function of the overall circuitry can be inserted between two circuit devices shown to be directly connected in the drawings. As yet another example, the present invention can be applied to a circuit with a variable reference voltage Vref. In view of the foregoing, the spirit of the present invention should cover all such and other modifications and variations, which should be interpreted to fall within the scope of the following claims and their equivalents.

What is claimed is:

1. A power converter with improved line transient response, comprising:
   a power stage circuit including at least one power transistor switch which operates to convert an input voltage to an output voltage;
   an error amplifier comparing a feedback signal with a reference signal to generate an error signal;
   an input voltage instant variation extraction circuit extracting an instant variation of the input voltage and generating a signal relating to the instant variation, the input voltage instant variation extraction circuit including:
      a first divided voltage circuit including a first resistor and a second resistor connected in series, and a first capacitor connected in parallel with the first resistor, wherein the first resistor has one terminal coupled to the input voltage and another terminal coupled to one terminal of the second resistor, and the second resistor has another terminal coupled to ground;
      a second divided voltage circuit including a third resistor and a fourth resistor connected in series, and a second capacitor connected in parallel with the fourth resistor, wherein the third resistor has one terminal coupled to the input voltage and another terminal coupled to one terminal of the fourth resistor, and the fourth resistor has another terminal coupled to ground; and
      an operational amplifier having inputs coupled respectively to a node between the first resistor and the second resistor, and to a node between the third resistor and the fourth resistor; and
   a pulse width modulation (PWM) comparator generating a PWM signal according to at least a ramp signal, the error signal, and the signal relating to the instant variation, to thereby control the operation of the power transistor switch in the power stage circuit.

2. The power converter of claim 1, wherein the signal relating to the instant variation is a value proportional to the instant variation of the input voltage.

3. The power converter of claim 1, wherein the power stage circuit performs one of the following voltage conversions: buck conversion, boost conversion, inverter conversion, buck-boost conversion, and fly back conversion.

4. The power converter of claim 1, further comprising an output voltage feedback circuit generating a second feedback signal relating to the output voltage, and wherein the PWM comparator generates the PWM signal according to the ramp signal, the error signal, the signal relating to the instant variation, and the second feedback signal.

5. The power converter of claim 4, wherein the second feedback signal and the ramp signal are added to generate a sum, and the sum is inputted to the PWM comparator.

6. The power converter of claim 4, wherein the second feedback signal, the error signal, and the signal relating to the instant variation are added to generate a sum, and the sum is inputted to the PWM comparator.

7. The power converter of claim 1, further comprising a driver circuit receiving the PWM signal and generating a corresponding voltage level to drive the power transistor switch.

8. A method for improving line transient response of a power converter, the power converter including a power stage circuit, the power stage circuit including at least a power transistor switch which operates to convert an input voltage to an output voltage, the method comprising:
   comparing a first feedback signal relating to the output voltage with a reference signal to generate an error signal;
   extracting an instant variation of the input voltage and generating a signal relating to the instant variation;
   retaining a first divided voltage value of the input voltage at a first instance;
   acquiring a second divided voltage value of the input voltage at a second instance;
   obtaining a difference between the first divided voltage value and the second divided voltage value;
   multiplying the difference between the first divided voltage value and the second divided voltage value by a ratio and outputting the result;
   receiving a ramp signal;
   generating a PWM signal according to at least the ramp signal, the error signal, and the signal relating to the instant variation; and
   controlling the power transistor switch in the power stage circuit according to the PWM signal.

9. The method of claim 8, wherein the power stage circuit performs one of the following voltage conversions: buck conversion, boost conversion, inverter conversion, buck-boost conversion, and fly back conversion.

10. The method of claim 8, further comprising: generating and outputting a second feedback signal which relates to the output voltage, and wherein the PWM signal is generated according to the ramp signal, the error signal, the signal relating to the instant variation, and the second feedback signal.

11. A control circuit for power converter, the power converter including at least a power transistor switch which operates to convert an input voltage to an output voltage, the control circuit including:
   an error amplifier comparing a first feedback signal relating to the input voltage with a reference signal to generate an error signal;

an input voltage instant variation extraction circuit extracting an instant variation of the input voltage and generating a signal relating to the instant variation, the input voltage instant variation extraction circuit including:
- a first divided voltage circuit including a first resistor and a second resistor connected in series, and a first capacitor connected in parallel with the first resistor, wherein the first resistor has one terminal coupled to the input voltage and another terminal coupled to one terminal of the second resistor, and the second resistor has another terminal coupled to ground;
- a second divided voltage circuit including a third resistor and a fourth resistor connected in series, and a second capacitor connected in parallel with the fourth resistor, wherein the third resistor has one terminal coupled to the input voltage and another terminal coupled to one terminal of the fourth resistor, and the fourth resistor has another terminal coupled to ground; and
- an operational amplifier having inputs coupled respectively to a node between the first resistor and the second resistor, and to a node between the third resistor and the fourth resistor; and a PWM comparator generating a PWM signal according to at least a ramp signal, the error signal, and the signal relating to the instant variation, to thereby control the operation of the power transistor switch in the power converter.

12. The control circuit of claim 11, wherein the signal relating to the instant variation is a value proportional to the input voltage instant variation.

13. The control circuit of claim 11, wherein the power stage circuit performs one of the following voltage conversions: buck conversion, boost conversion, inverter conversion, buck-boost conversion, and fly back conversion.

14. The control circuit of claim 11, wherein the control circuit further receives a second feedback signal relating to the output voltage, and adds the second feedback signal and the ramp signal to generate a sum which is inputted to the PWM comparator.

15. The control circuit of claim 11, wherein the control circuit further acquires a second feedback signal relating to the output voltage, and adds the second feedback signal, the error signal, and the signal relating to the instant variation to generate a sum which is inputted to the PWM comparator.

16. The control circuit of claim 11, further including a driver circuit for receiving the PWM signal and generating a corresponding voltage level to drive the power transistor switch.

* * * * *